United States Patent
Jin et al.

(10) Patent No.: US 9,329,288 B2
(45) Date of Patent: May 3, 2016

(54) DATA ACQUISITION AND PRESTACK MIGRATION BASED ON SEISMIC VISIBILITY ANALYSIS

(75) Inventors: Shengwin Jin, Sugar Land, TX (US); Shiyong Xu, Sugar Land, TX (US)

(73) Assignee: LANDMARK GRAPHICS CORPORATION, Houston, TX (US)

( * ) Notice: Subject to any disclaimer, the term of this patent is extended or adjusted under 35 U.S.C. 154(b) by 954 days.

(21) Appl. No.: 13/142,478

(22) PCT Filed: Jan. 19, 2009

(86) PCT No.: PCT/US2009/031400
§ 371 (c)(1),
(2), (4) Date: Jun. 28, 2011

(87) PCT Pub. No.: WO2010/082938
PCT Pub. Date: Jul. 22, 2010

(65) Prior Publication Data
US 2011/0273959 A1    Nov. 10, 2011

(51) Int. Cl.
*G01V 1/28* (2006.01)
*G01V 1/30* (2006.01)
(Continued)

(52) U.S. Cl.
CPC *G01V 1/30* (2013.01); *G01V 1/003* (2013.01); *G01V 1/345* (2013.01); *G01V 99/005* (2013.01);
(Continued)

(58) Field of Classification Search
CPC ............. G01V 1/00; G01V 1/20; G01V 1/28; G01V 1/30; G01V 1/32; G01V 1/48; G01V 1/50
USPC ......... 345/419, 169; 356/437; 367/38, 50–73; 606/182; 702/14–18; 703/2
See application file for complete search history.

(56) References Cited

U.S. PATENT DOCUMENTS 4,890,242 A   12/1989  Sinha et al.
4,953,142 A * 8/1990  Rimmer .......................... 367/73
(Continued)

FOREIGN PATENT DOCUMENTS

AU    2009337134    3/2014
WO    02/23222      3/2002
(Continued)

OTHER PUBLICATIONS

Baysal, Edip et al., "A Two-Way Nonreflecting Wave Equation", Geophysics, vol. 49, No. 2, (Feb. 1984), pp. 132-141, 11 Figs.
(Continued)

*Primary Examiner* — Luke Ratcliffe
*Assistant Examiner* — Amienatta M Ndure Jobe
(74) *Attorney, Agent, or Firm* — Krueger Iselin LLP; John W. Wustenberg

(57) ABSTRACT

Seismic visibility analysis of selected subsurface structures is employed to determine surface locations offering high visibility of target events. These locations can then be used as a basis for acquiring additional seismic survey data and/or selecting existing traces for re-migration with more sophisticated migration methods. With either usage, the newly migrated data is expected to offer enhanced images of the target event. In some embodiments, the visibility determination includes using a wave equation based propagator to find, for each of multiple simulated shots, a reflection wavefield from the target event in a seismic model; and to calculate, for each of multiple receiver positions, a contribution signal from each reflection wavefield. The visibility determination further includes converting each contribution signal into a source-receiver visibility value. Because data acquisition and/or re-migration is limited to the selected region, the imaging effort for the target event is significantly reduced.

18 Claims, 4 Drawing Sheets

(51) Int. Cl.
  *G01V 1/00*    (2006.01)
  *G01V 1/34*    (2006.01)
  *G01V 99/00*   (2009.01)

(52) U.S. Cl.
  CPC ....... *G01V 2210/67* (2013.01); *G01V 2210/673* (2013.01); *G01V 2210/675* (2013.01); *G01V 2210/679* (2013.01)

(56) References Cited

U.S. PATENT DOCUMENTS

| | | | |
|---|---|---|---|
| 5,014,230 | A | 5/1991 | Sinha et al. |
| 5,138,584 | A | 8/1992 | Hale |
| 5,274,605 | A | 12/1993 | Hill |
| 5,490,120 | A | 2/1996 | Li et al. |
| 5,530,679 | A | 6/1996 | Albertin |
| 5,544,126 | A | 8/1996 | Berryhill |
| 5,784,334 | A * | 7/1998 | Sena et al. ............ 367/47 |
| 6,002,642 | A | 12/1999 | Krebs |
| 6,021,094 | A | 2/2000 | Ober et al. |
| 6,311,131 | B1 * | 10/2001 | Peardon et al. .......... 702/14 |
| 6,446,007 | B1 | 9/2002 | Finn et al. |
| 6,611,761 | B2 | 8/2003 | Sinha et al. |
| 6,687,618 | B2 | 2/2004 | Bevc et al. |
| 6,778,909 | B1 | 8/2004 | Popovici et al. |
| 6,864,890 | B2 | 3/2005 | Meek et al. |
| 7,065,004 | B2 | 6/2006 | Jiao et al. |
| 7,196,969 | B1 | 3/2007 | Karazincir et al. |
| 7,315,783 | B2 | 1/2008 | Lou |
| 7,355,923 | B2 | 4/2008 | Reshef et al. |
| 7,376,517 | B2 | 5/2008 | Rickett |
| 7,400,553 | B1 * | 7/2008 | Jin et al. ............. 367/53 |
| 7,663,972 | B2 | 2/2010 | Martinez et al. |
| 8,116,168 | B1 | 2/2012 | Luo et al. |
| 8,830,788 | B2 | 9/2014 | Xia et al. |
| 2002/0033832 | A1 * | 3/2002 | Glatman ............ 345/619 |
| 2004/0196738 | A1 | 10/2004 | Tal-Ezer |
| 2005/0207278 | A1 | 9/2005 | Reshef et al. |
| 2005/0270537 | A1 | 12/2005 | Mian et al. |
| 2006/0190179 | A1 | 8/2006 | Herrmann et al. |
| 2008/0109168 | A1 | 5/2008 | Koren et al. |
| 2008/0130411 | A1 | 6/2008 | Brandsberg-Dhal et al. |
| 2008/0137480 | A1 | 6/2008 | MacNeill |
| 2009/0213693 | A1 | 8/2009 | Du et al. |
| 2010/0088035 | A1 | 4/2010 | Etgen |
| 2011/0007604 | A1 | 1/2011 | Liu et al. |
| 2011/0075516 | A1 | 3/2011 | Xia et al. |
| 2011/0273959 | A1 | 11/2011 | Jin et al. |
| 2012/0218861 | A1 | 8/2012 | Xia et al. |

FOREIGN PATENT DOCUMENTS

| | | |
|---|---|---|
| WO | WO-2010/082938 | 7/2010 |
| WO | WO-2010/120301 | 10/2010 |
| WO | WO-2011/053327 | 5/2011 |
| WO | WO-2012/116134 | 8/2012 |

OTHER PUBLICATIONS

Cerjan, Charles "Short Note: A Nonreflecting Boundary Condition for Discrete Acoustic and Elastic Wave Equations", Geophysics, vol. 50, No. 1, (Apr. 1985), pp. 705-708.

Chang, W. F., et al., "3D Acoustic Prestack Reverse-Time Migration", Geophysical Prospecting 38, (1990), pp. 737-755.

Dablain, M A., "The Application of High-order Differencing to the Scalar Wave Equation", Geophysics, vol. 51, No. 1, 13 Figs., 1 Table, (Jan. 1986), pp. 54-66.

Duveneck, Eric et al., "Acoustic VTI Wave Equations and Their Applications for Anisotropic Reverse-Time Migration", SEG Las Vegas 2008 Annual Meeting, (2008), pp. 2186-2190.

Hoffmann, Jorgen "Illumination, Resolution and Image Quality of PP- and PS-Waves for Survey Planning", The Leading Edge, 20(9), (2001),pp. 1008-1014.

Jin, Shengwen et al., "Depth Migration Using the Windowed Generalized Screen Propagators", 1998 SEG Expanded Abstracts, (1998), pp. 1-4.

Jin, Shengwen et al., "Illumination Amplitude Correction with Beamlet Migration", Acquisition/Processing, The Leading Edge, (Sep. 2006), pp. 1045-1050.

Jin, Shengwen et al., "One-Return Wave Equation Migration Utility", U.S. Appl. No. 11/606,551, filed Nov. 30, 2006., 12 pgs.

Komatitsch, Dimitri et al., "A Perfectly Matched Layer Absorbing Boundary Condition for the Second-Order Seismic Wave Equation", Geophys, J. Int., (2003), pp. 154, 146-153.

Kosloff, Dan D., et al., "Forward Modeling by Fourier Method", Geophysics, vol. 47, No. 10, (Oct. 1982), pp. 1402-1412.

Kuehl, Henning et al., "Generalized Least-Squares DSR Migration Using a Common Angle Imaging Condition", SEG Conference, San Antonio, Texas, (Fall 2001), 4 pgs.

Lesage, Anne-Cecile et al., "3D Reverse-Time Migration with Hybrid Finite Difference-Pseudospectral Method", SEG Las Vegas 2008 Annual Meeting, (2008),pp. 2257-2261.

Liu, Zhenyue "An Analytical Approach to Migration Velocity Analysis", Geophysics, vol. 62, No. 4, (Jul. 1998), pp. 1238-1249, 17 Figs, 1 Table.

Luo, M. et al., "Recover Scattering Wave Amplitudes from Back Propagated Waves", Technical Report No. 12, Modeling and Imaging Project, University of California, Santa Cruz, (2005),pp. 25-33.

Luo, Mingqui et al., "3D Beamlet Prestack Depth Migration Using the Local Cosine Basis Propagator", Modeling and Imaging Laboratory, IGPP, University of California, Santa Gruz, CA, (2003),pp. 1-4.

McMechan, G. A., "Migration by Extrapolation of Time-Dependent Boundary Values", Geophysical Prospecting 31, (1983), pp. 413-320.

Meng, Zhaobo et al., "3D Analytical Migration Velocity Analysis I: Two-step Velocity Estimation by Reflector-Normal Update", 69th Annual International Meeting SEG, Expanded Abstracts, 4 pgs.

Mingqui, Lou et al., "Hybrid One-Way and Full-Way Wave Equation Migration", U.S. Appl. No. 12/214,342, filed Jun. 18, 2008, 12 pgs.

PCT International Search Report and Written Opinion, dated Feb. 20, 2009, Appl No. PCT/US/0931400, "Data Acquisition and Prestack Migration Based on Seismic Visibility Analysis", filed Jan. 19, 2009, 9 pgs.

PCT International Search Report and Written Opinion, dated Jun. 8, 2009, Appl No. PCT/US2009/040793, "Seismic Imaging Systems and Methods Employing a Fast Target-Oriented Illumination Calculation", filed Apr. 16, 2009, 9 pgs.

PCT Internat'l Search Report and Written Opinion, dated Dec. 18, 2009, Appl No. PCT/US09/62911, Seismic Imaging Systems and Methods Employing 3D Reverse Time Migration with Tilted Transverse Isotropy, filed Nov. 2, 2009, 9 pgs.

Ristow, Dietrich et al., "Fourier Finite-Difference Migration", Geophysics, vol. 59, No. 12, (Dec. 1984),pp. 1882-1893.

Sava, Paul "Wave-Equation Migration Velocity Analysis—I: Theory", Stanford Exploration Project, (Jul. 22, 2004), pp. 1-37.

Sava, Paul C., et al., "Angle-Domain Common-Image Gathers by Wavefield Continuation Methods", Geophysics, vol. 68, No. 3, (May 2003),pp. 1065-1074, 14 Figs.

Stoffa, P. L., et al., "Split-Step Fourier Migration", Geophysics, vol. 55, No. 4, (Apr. 1990),pp. 410-421, 11 Figs.

US Non-Final Office Action, dated Apr. 12, 2011, U.S. Appl. No. 12/214,342. "Hybrid One-Way and Full-Way Wave Equation Migration", filed Jun. 18, 2008, 12 pgs.

Whitmore, N. D., "Iterative Depth Migration by Backward Time Propagation", Seismic 10-Migration, S10.1, (1983), pp. 382-385.

Wu, R. S., et al., "Mapping Directional Illumination and Acquisition-Aperture Efficacy by Beamlet Propagator", SEG Expanded Abstracts 21, (2002), p. 1352.

Xia, Fan et al., "Seismic Imaging Systems and Methods Employing Tomographic Migration-Velocity Analysis Using common Angle Image Gathers", U.S. Appl No. 12/566,885, filed Sep. 25, 2009, 20 pgs.

Xia, Fan, "Sensitivity Kernel-Based Migration Velocity Analysis in 3D Anisotropic Media", U.S. Patent Application, filed Feb. 24, 2011, 23 pages.

(56) References Cited

OTHER PUBLICATIONS

Xie, Xiao B., et al., "Extracting an Angle Domain Information from Migrated Wavefield", SEG 72nd Annual Meeting, Expanded Abstracts 21, (Oct. 6, 2002), p. 1352.

Xie, Xiao B., et al., "The Finite-Frequency Sensitivity Kernel for Migration Residual Moveout and its Applications in Migration Velocity Analysis", Geophysics, vol. 73, No. 6, Nov.-Dec. 2008, pp. 241-249.

Xie, Xiao B., et al., "Three-Dimensional Illumination Analysis Using Wave Equation Based Propagator", SEG Expanded Abstracts 22, (2003), pp. 1360-1363.

Xie, Xiao-Bi et al., "Wave-Equation-Based Seismic Illumination Analysis", Geophysics, vol. 71, No. 5, (Sep. 20, 2006), pp. S169-S177, and 10 Figs.

Youn, Oong K., et al., "Depth Imaging with Multiples", Geophysics, vol. 66, No. 1, (Jan./Feb. 2001), pp. 246-255.

Jin, Yaochu, et al., "A Framework for Evolutionary Optimization with Approximate Fitness Functions", IEEE Transactions on Evolutionary Computation, vol. 6, No. 5, (Oct. 2002), pp. 481-494.

Jin, Yaochu, et al., "Neural Network Regularization and Ensembling Using Multi-Objective Evolutionary Algorithms", Congress on Evolutionary Computation, Portland, Oregon, (2004), 8 pgs.

PCT International Preliminary Report on Patentability, dated Jul. 28, 2011, Appl No. PCT/US2009/031400, "Data Acquisition and Prestack Migration Based on Seismic Visibility Analysis", filed Jan. 19, 2009, 6 pgs., 6 pgs.

PCT International Preliminary Report on Patentability, dated Oct. 27, 2011, Appl No. PCT/US2009/040793, "Seismic Imaging Systems and Methods Employing a Fast Target-Oriented Illumination Calculation", filed Apr. 16, 2009, 6 pgs.

PCT International Search Report and Written Opinion, dated May 1, 2012, Appl No. PCT/US2012/026243, "Sensitivity Kernel-Based Migration Velocity Analysis in 3D Anisotropic Media", filed Feb. 24, 2011, 7 pgs.

He, Yaofeng, et al., "Angle-domain sensitivity kernels for migration velocity analysis: Comparison between theoretically derived and directly measured", *SEG Expanded Abstracts 28, 2909* (2009). Citation retrieved from the internet with citation at <URL: http://library.seg.org/getabs/servlet/GetabsServlet?prog=normal&id=SEGEAB000028000001002909000001&idtype=cvips&gifs=yes&ref=no> Retrieved from the Internet, 6 pgs.

He, Yaofeng, et al., "Velocity analysis using shot-indexed sensitivity kernels: application to a complex geological model", *SEG Denver Annual Meeting*, 2010. <URL: http://www.es.ucsc.edu/~acti/New_WTOPI_Web/PUBLICATIONS_papers/seg/seg2010/HeXie_2010_velocity_analysis.pdf?_Page_1, Introduction section, second para, Shot Index Sensitivity Kernel section, first para, 6 pgs.

PCT International Preliminary Report on Patentability, dated May 18, 2012, Appl No. PCT/US2009/062911, "Seismic Imaging Systems and Methods Employing 3D Reverse Time Migration with Tilted Transverse Isotropy", filed Nov. 2, 2009, 5 pgs.

US Non-Final Office Action, dated Jul. 16, 2013, U.S. Appl. No. 13/033,768, "Sensitivity Kernel-Based Migration Velocity Analysis in 3D Anisotropic Media", filed Feb. 14, 2011, 14 pgs.

CN First Office Action, dated May 16, 2013, Appl. No. 200980154752.0, "Data Acquisition and Prestack Migration Based on Seismic Visibility Analysis", filed Jan. 19, 2009, 3 pgs.

CN Second Office Action, dated Oct. 21, 2013, Appl. No. 200980154752.0, "Data Acquisition and Prestack Migration Based on Seismic Visibility Analysis", filed Jan. 19, 2009, 14 pgs.

US Final Office Action, dated Dec. 26, 2013 U.S. Appl. No. 13/033,768, "Sensitivity Kernel-based migration velocity analysis in 3D anisotropic media," filed Feb. 24, 2011, 25 pgs.

Sava, Paul, et al., "Sensitivity Kernels for Wave-Equation Migration Velocity Analysis", Stanford Exploration Project, Report 115, May 22, 2004, pp. 199-213.

CA Office Action, dated Jul. 24, 2013, Appl No. 2,747,146, "Data Acquisition and Prestack Migration Based on Seismic Visibility Analysis", filed Jan. 19, 2009, 2 pgs.

AU First Examination Report, dated May 3, 2014, Appl. No. 2012220584, "Sensitivity Kernel-Based Migration Velocity Analysis in 3D Anisotropic Media," Filed Aug. 16, 2013, 3 pgs.

US Non-Final Office Action, dated Oct. 8, 2014, U.S. Appl. No. 13/496,913, "Seismic Imaging Systems and Methods Employing a 3D Reverse Time Migration with Tilted Transverse Isotropy," Filed Mar. 19, 2012, 25 pgs.

CA Second Examiner's Letter, dated Mar. 10, 2015, Appl No. 2,747,146, "Data Acquisition and Prestack Migration Based on Seismic Visibility Analysis," Filed Jan. 19, 2009, 6 pgs.

US Final Office Action, Apr. 15, 2015, U.S. Appl. No. 13/496,913, "Seismic Imaging Systems and Methods Employing a 3D Reverse Time Migration with Tilted Transverse Isotropy," Filed Mar. 19, 2012, 19 pgs.

CA Examiner's Requisition, dated Nov. 17, 2014, Appl No. 2,828,425, "Sensitivity Kernel-Based Migration Velocity Analysis in 3D Anisotropic Media", filed Feb. 24, 2011, 6 pgs.

EA Office Action, dated Mar. 12, 2015, Appl No. 201391218, "Sensitivity Kernel-Based Migration Velocity Analysis in 3D Anisotropic Media," filed Feb. 24, 2011, 3 pgs.

EP Extended Search Report, dated Aug. 5, 2015, "Data Acquisition and Prestack Migration Based on Seismic Visibility Analysis" Appln, No. 09838520.6, filed Jan. 19, 2009, 9 pgs.

US Non-Final Office Action, dated Oct. 2, 2015, U.S. Appl. No. 13/496,913, "Seismic Imaging Systems and Methods Employing a 3D Reverse Time Migration with Tilted Transverse Isotropy," Filed Nov. 2, 2009, 15 pgs.

Rickett, J. E., "Illumination-based normalization for wave-equation depth migration", Geophysics, vol. 68, No. 4, Jul. 1, 2003, pp. 1371-1379, XP002621555.

Yang, Hui et al., "Target Oriented Full-Wave Equation Based Illumination Analysis," SEG Las Vegas 2008 Annual Meeting, p. 2216-2220, Society of Exploration Geophysicists.

* cited by examiner

Fig. 1
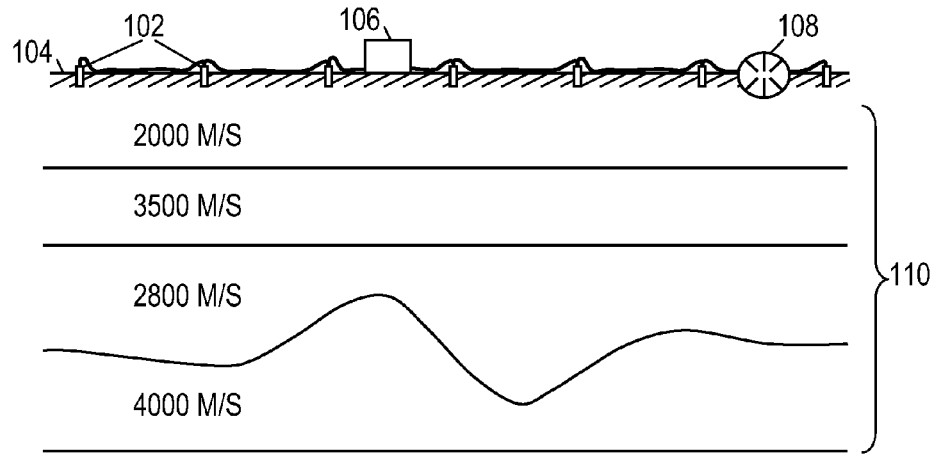
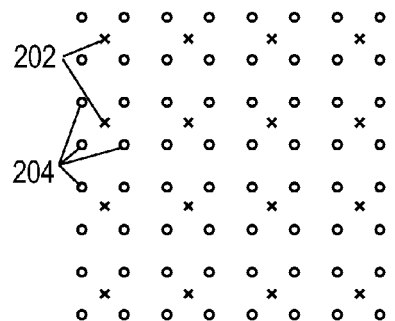
Fig. 2
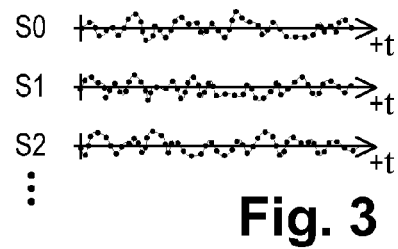
Fig. 3
Fig. 4
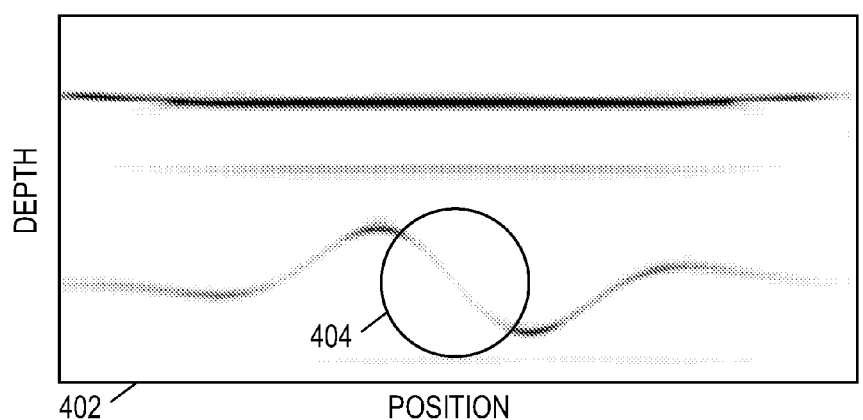

Fig. 9
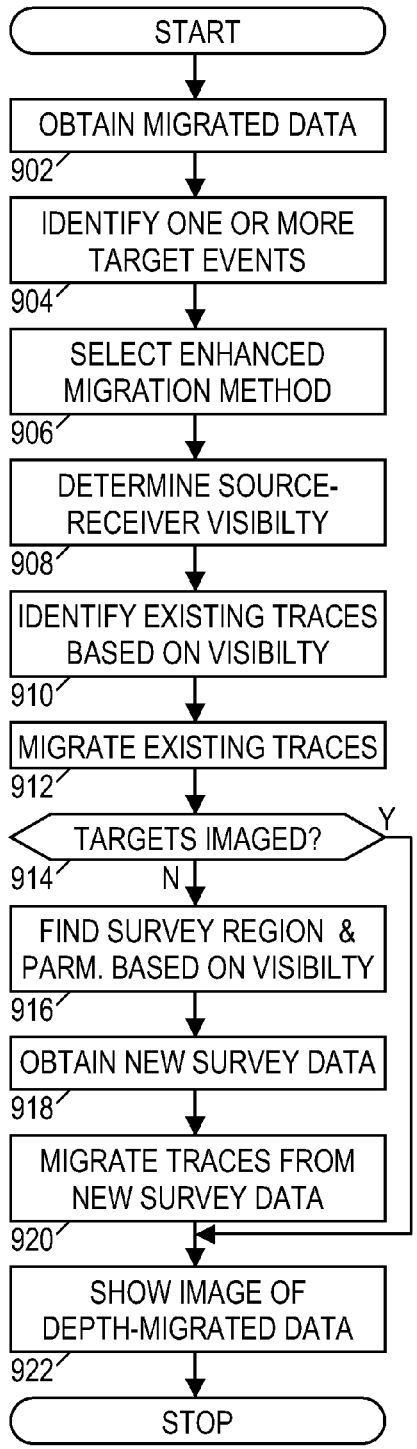
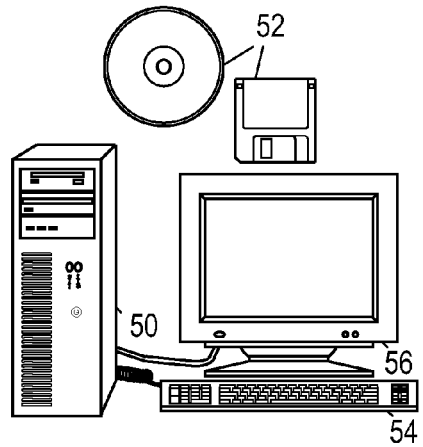
Fig. 10

DATA ACQUISITION AND PRESTACK MIGRATION BASED ON SEISMIC VISIBILITY ANALYSIS

BACKGROUND

Scientists and engineers often employ seismic surveys for exploration, geophysical research, and engineering projects. Seismic surveys can provide information about underground structures, including formation boundaries, rock types, and the presence or absence of fluid reservoirs. Such information greatly aids searches for water, geothermal reservoirs, and mineral deposits such as hydrocarbons and ores. Oil companies in particular often invest in extensive seismic surveys to select sites for exploratory oil wells.

Conventional seismic surveys employ artificial seismic energy sources such as shot charges, air guns, or vibratory sources to generate seismic waves. The sources, when fired, create a seismic "event", i.e., a pulse of seismic energy that propagates as seismic waves from the source down into the earth. Faults and boundaries between different formations create differences in acoustic impedance that cause partial reflections of the seismic waves. A seismic sensor array detects and records these reflections for later analysis. Sophisticated processing techniques are then applied to the recorded signals to extract an image or other representation of the subsurface structure.

Unfortunately, seismic analysts often find that certain subsurface features are poorly imaged or inadequately distinguishable. In such circumstances, the only solutions are to pursue a more sophisticated processing technique or push for additional data acquisition in the previously-surveyed area. Each of these solutions can be prohibitively expensive in terms of time and money.

SUMMARY

Accordingly, there are disclosed herein systems and methods for performing seismic visibility analysis of selected subsurface structures. These systems and methods identify the seismic source and receiver positions that can best reveal the details of the subsurface structure. These positions can then be used as the basis for acquiring additional seismic data and/or subjecting a selected subset of the existing data to more sophisticated data processing. Because the region of data acquisition and/or processing is greatly reduced, the associated expenses are minimized.

Some illustrative method embodiments include a seismic survey method that includes: determining visibility of a target event as a function of seismic source and receiver positions; and acquiring seismic data in a region selected at least in part to include positions having visibility values above a threshold. The target event can then be imaged based on the newly acquired seismic data. The illustrative method embodiments also include a seismic migration method that includes: determining visibility of a target event at the source and receiver positions of traces in an existing seismic survey; and re-migrating traces having visibility values above a threshold to image the target event. In both instances, the visibility determination may include using a wave equation based propagator to find, for each of multiple simulated shots, a reflection wavefield from the target event in a seismic model; and to calculate, for each of multiple receiver positions, a contribution signal from each reflection wavefield. The visibility determination may further include converting each contribution signal into a source-receiver visibility value.

BRIEF DESCRIPTION OF THE DRAWINGS

A better understanding of the various disclosed embodiments can be obtained when the detailed description is considered in conjunction with the attached drawing, in which:

FIG. 1 shows an illustrative seismic survey environment;

FIG. 2 shows an illustrative seismic source and receiver geometry;

FIG. 3 shows illustrative seismic traces;

FIG. 4 shows a migrated depth image for an illustrative seismic model;

FIG. 9 shows a flow diagram of an illustrative visibility analysis method; and

FIG. 10 shows an illustrative visibility analysis system.

Figure 5B:
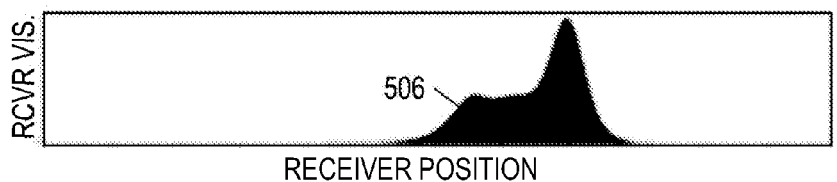
FIG. 5b shows an illustrative graph of receiver visibility.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the appended claims.

DETAILED DESCRIPTION

This disclosure provides various visibility analysis methods and systems that identify the seismic survey source and/or receiver locations that can best measure the characteristics of one or more selected subsurface features. Analysts can then focus their acquisition and processing efforts on these regions to improve the imaging detail for these selected features. The disclosed systems and methods are best understood when described in an illustrative usage context.

Accordingly, FIG. 1 shows an illustrative seismic survey environment, in which an array of seismic receivers 102 are positioned in a spaced-apart arrangement on the earth's surface 104 to detect seismic waves. The receivers 102 are coupled wirelessly or via cable to a data acquisition unit 106 that receives, processes, and stores the seismic signal data collected by the receivers. A seismic energy source 108 (e.g., a vibrator truck) is triggered at multiple positions to generate seismic energy waves that propagate through the earth 110 and reflect from acoustic impedance discontinuities to reach the receivers 102. Such discontinuities may be created by faults, boundaries between formation beds, and boundaries between formation fluids. The discontinuities will appear as bright spots in the subsurface structure representation that is derived from the seismic signal data.

FIG. 1 further shows an illustrative subsurface model that will be used as an example in this disclosure. In this model, the earth has four relatively flat formation layers with a steeply curved boundary between the third and fourth layers. The speed of sound in each of the layers from top to bottom is 2000 m/s, 3500 m/s, 2800 m/s, and 4000 m/s, respectively.

Note that for purposes of illustration, FIG. 1 is not drawn to scale. The horizontal extent of the receiver array is expected to be limited to a couple of kilometers or less, while the horizontal dimension of the subsurface model is sixteen kilometers and the vertical dimension is five kilometers.

FIG. 2 shows an illustrative geometry for source positions 202 and receiver positions 204, as they might be seen from an overhead view. Viable seismic survey geometries are infinite in variety, and can be gathered on a sector-by-sector basis, a rolling geometry basis, a moving-array basis, and various combinations thereof. The main message here is that the number of receiver signals acquired in response to each firing of the seismic source is fairly large, and when the number of source firings is taken into account, the resulting number of traces can easily reach into the millions.

FIG. 3 shows some illustrative received seismic signal traces S1-S3. The traces can represent displacement, velocity, acceleration, pressure, or some other measure of seismic energy intensity as a function of time. The signal received by each receiver is typically sampled and digitized to between 8 and 32 bits of resolution at a rate of about 500 samples per second for a duration of about 30 seconds after each shot. In some cases, the receivers sense multi-component data, further increasing the amount of sample data for each trace. The trace data may be filtered and compressed before storage. The stored seismic survey data is transported or otherwise communicated to a data processing facility.

A network of computers at the data processing facility processes the data to estimate the volumetric distribution of sound velocities using known techniques. See, e.g., Jon F. Claerbout, *Fundamentals of Geophysical Data Processing*, p. 246-56, which is hereby incorporated herein by reference. Alternatively, the velocity distribution may be independently available from other sources, e.g., well logs. With the estimated velocity distribution, the data processing facility "migrates" the seismic traces, translating them from functions of time to functions of depth.

Various migration techniques exist, including ones based on the one-way wave equation migration (one-way WEM), and full-way wave equation based reverse-time migration (RTM). One-way WEM is a popular, widely applied technique because it is effective in many cases and is relatively inexpensive in terms of computational complexity. However, in areas having complex structures, especially those that generate strong overturned waves (e.g., prism waves) and multiple reflections (which may create duplex waves), one-way WEM simply fails to image the complex structures. This situation may be exacerbated in marine seismic surveys since the usage of narrow-azimuth receivers limits the amount of cross-line offset.

RTM is able to address such imaging problems. (See, e.g., E. Baysal, D. D. Kosloff, and J. W. C. Sherwood, "Reverse time migration", Geophysics, 48, 1514 [1983]; G. A. McMechan, "Migration by extrapolation of time-dependent boundary values", Geophysical Prospecting, 31, 413-420 [1983]; and N. D. Whitmore, "Iterative depth imaging by backward time propagation", SEG Expanded Abstracts, 2, 382-385 [1983].) In recent years, RTM has become more attractive for prestack depth imaging processing in complex media and subsalt structures. However, compared with the one-way WEM method, RTM is computationally expensive and requires the data processing facility to have computers with large memories and large disk capacities. Moreover, RTM becomes even more challenging when migrating high-frequency components of the wavefield due to the numerical dispersion of the finite-difference scheme.

FIG. 4 shows a migrated depth image 402 for the illustrative seismic model of FIG. 1. One hundred shots were simulated by finite-difference forward modeling. The shot position ranged from 6 km to 14 km with an 80 meter shot interval. The receiver aperture of each shot covered the whole model. The receiver interval is 10 meters. The depth image of FIG. 4 was obtained by migrating all shots using the full aperture. In general, the curved event is well imaged but the amplitude of the steep dip event 404 is weak. To get a better image of this target event, it is not necessary to obtain large amounts of new survey data or to reprocess all of the existing data using RTM. Instead, we can just focus on the seismic traces that have significant contributions to imaging the target event. The seismic visibility analysis methods and systems described below will provide a quantitative identification of which traces provide such contributions.

Figure 5A:
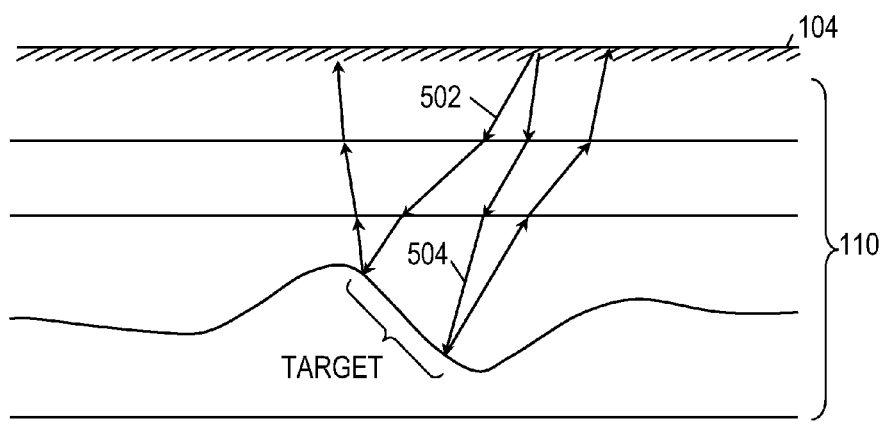
FIG. 5a illustrates seismic energy propagating from a source to a target.

FIG. 5a is a schematic ray-tracing illustration of seismic propagating seismic energy. Ray 502 shows energy propagating from a source to one end of the target event and back to the surface, while ray 504 shows energy propagating from the source to the other end of the target event and back to the surface. In practice, wave equation migration is employed to propagate the seismic energy downwards as back to the surface. More specifically, visibility analysis is preferably implemented using a wave equation based propagator rather than a high frequency asymptotic ray-based approach. The wave equation method is more accurate and provides a more reliable result.

The visibility analysis takes place in two phases. First the wavefield of a simulated shot is propagated downward and the software measures the reflection wavefield from the target event. In the second phase, the reflection wavefield is propagated back and the software measures the target's contribution to the signals recorded by each receiver. The source-receiver visibility V(s,r) of the target event is measured by integrating the square of the measured contribution signal $c_{s,r}(t)$ (similar to squaring and summing each of the sample values for a trace in FIG. 3):

$$V(s,r) = \int_0^T c_{s,r}^2(t)dt,$$

where r is the receiver position, s is the source position, and $c_{s,r}(t)$ is the measured contribution signal as a function of time between the shot firing time t=0 and the end of the recording interval t=T. The simulated shot and receiver positions can be uniformly spaced throughout the model area, or they can be customized to the contemplated survey environment (e.g., a marine streamer geometry).

The receiver visibility $V_R(r)$ is defined as the source-receiver visibility V(s,r) for a given source position s=S:

$$V_R(r) = V(S,r).$$

FIG. 5b illustrates the receiver visibility 506 of target event 404 for the source firing position shown in FIG. 5a. It can be seen that for this source position, the receiver visibility is largely limited to a well-defined neighborhood above the target event.

The term source visibility $V_s(s)$ is herein defined as a summation of the source-receiver visibility V(s,r) over all receiver positions {R}:

$$V_S(s) = \sum_{r \in \{R\}} V(s, r).$$

Figure 6:
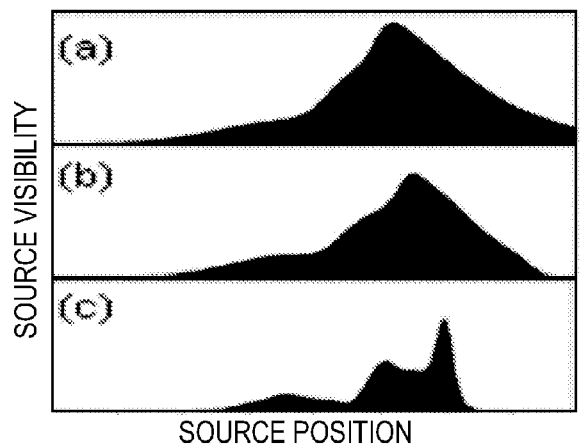
FIGS. 6a-6c show illustrative graphs of source visibility under different assumptions.

FIG. 6 shows the source visibility of target event 404 under three different assumptions. FIG. 6a shows the source visibility with full receiver aperture (i.e., all receivers can respond to all source firings). FIG. 6b shows the source visibility assuming a ±2 km aperture (i.e., only the receivers within 2 kilometers of the source position can respond to the source firing). FIG. 6c shows the zero-offset source visibility (i.e., the receiver is co-located with the source).[1] In each case, the visibility varies with source position, and those shots in the neighborhood above and to the right of the target event contribute most to the visibility of the target event. A comparison of these source visibility functions enables the effects of receiver aperture to be readily quantified. A lot of visibility is lost if only the zero-offset case is considered.

[1] As an aside, it is noted that the zero-offset visibility calculations can be simplified using the "exploding reflector" assumption, in which the target events are treated as a distributed set of point explosions each having a strength equal to the reflectivity of the target event.

Figure 7:
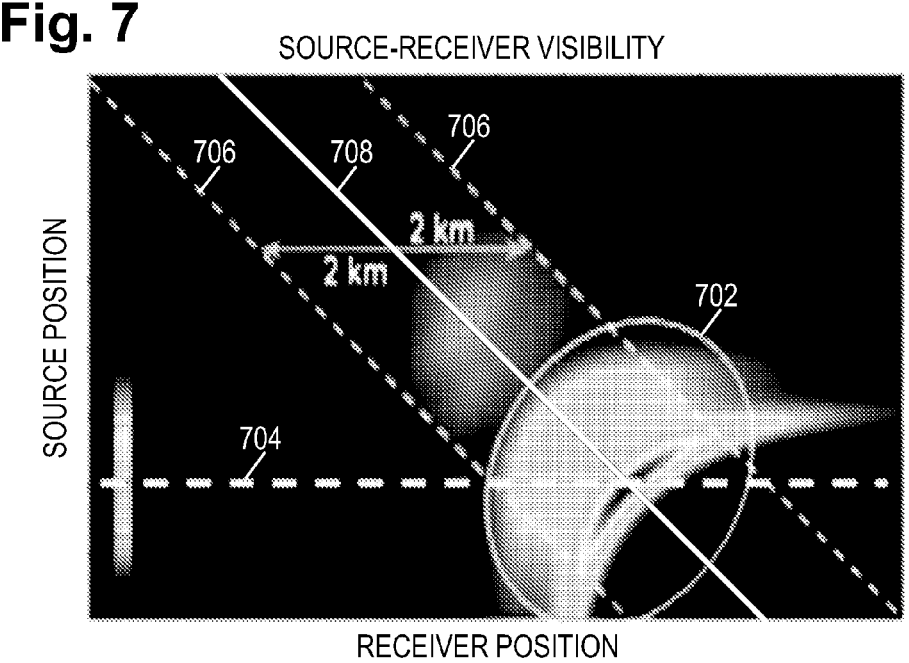
FIG. 7 shows an illustrative source-receiver visibility function.

FIG. 7 shows a map of the source-receiver visibility function V(s,r) for the target event 404. The horizontal axis denotes the receiver location, while the vertical axis denotes the source location. The traces for the source-receiver positions found within region 702 contribute the most to the visibility of event 404. The visibility function along the line 704 is the receiver visibility function $V_R(r)$ for the source position shown in FIG. 5a. The zero-offset source visibility function shown in FIG. 6c is found along the 45° line 708. The source visibility shown in FIG. 6c is found by integrating horizontally across the entire figure. The source visibility function shown in FIG. 6b is found by integrating horizontally between lines 706.

Figure 8:
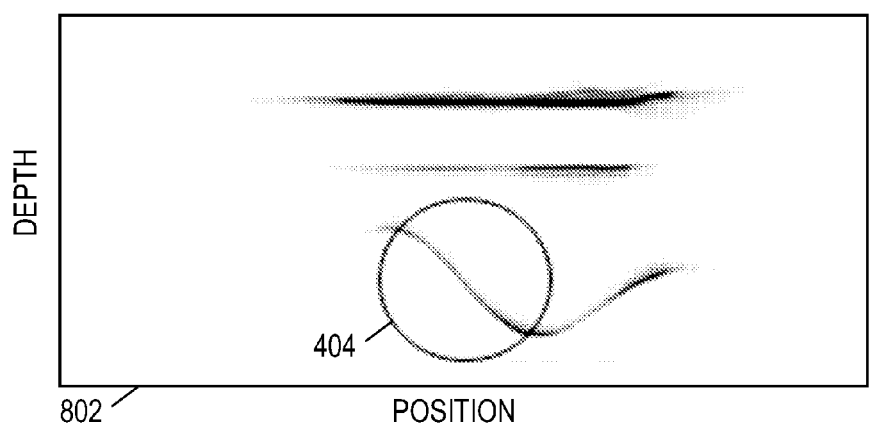
FIG. 8 shows an illustrative migrated depth image for a migrated subset of seismic data.

The maximum receiver aperture (which corresponds to the cable length in seismic surveys) can be selected by adjusting the spacing between the lines 706 to capture the bulk of the nonzero area under the visibility function. The source positions can then be selected to capture the bulk of the nonzero area under the source visibility function. Using this strategy to select traces (and, if necessary, acquire data) for prestack depth migration greatly reduces the amount of effort needed to improve imaging of the target event. FIG. 8 shows a depth migration image using only the selected data, which demonstrates that the amplitude behavior of the visibility controlled image is more balanced.

FIG. 9 shows an illustrative visibility analysis method that can be carried out by a computer system automatically or under the guidance of a user such as a reservoir analyst. Beginning in block 902, the system obtains data representing a depth-migrated image. In many cases, this data will have been generated by the system itself based on a previous seismic survey. In block 904 the system identifies one or more target events, e.g., features that have been inadequately imaged. In some implementations, the system identifies the target events by displaying the depth-migrated image to a user and soliciting input from the user about which areas appear to be adequately or inadequately defined.

In block 906, the system selects a migration method that is more sophisticated than the one used to generate the original data migration. For example, the original migration could have employed one-way WEM, but the system may be capable of implementing full-wave RTM. Where multiple enhancements are available, the user may select the desired migration method.

In block 908, the system determines source-receiver visibility V(s,r) using the selected migration method to simulate shots in the tentative structure identified in the original depth-migrated data. As previously mentioned, the visibility is determined by calculating reflection wavefields from the target events for each of multiple source positions, and then measuring the signal contributions from these reflection wavefields to the signals measured at each of multiple receiver positions.

In block 910, the system identifies those existing traces whose source-receiver positions have target event visibilities above a given threshold. The threshold can be preset, based on a peak visibility value, or selected to capture a predetermined fraction (e.g., 90%) of the area under the multidimensional visibility surface. In block 912, the system applies the selected migration method to the identified high-visibility traces. Because the identified traces are expected to represent a small subset of the available data, the use of the more sophisticated migration method may be eminently feasible.

In block 914, the system determines whether the target events have been adequately imaged, and if so, the method jumps ahead to block 922. In some implementations, the system makes this determination by displaying the depth-migrated data to a user and soliciting user feedback. If the target event is still inadequately imaged, it is expected that additional data acquisition will be needed. Consequently, in block 916, the system identifies a survey region and other survey parameters based at least in part on the source-receiver visibility calculations. In some implementations, the range of desirable source and receiver positions can be determined by drawing a rectangle (for land surveys) or a parallelogram (for marine surveys where the receiver position varies with source position) that encloses the substantial bulk of the high-visibility value region.

In block 918, the system obtains the trace data from the new survey, and in block 920 the selected migration method is applied to generate a new depth-migrated data image of the region containing the target events. In block 922, a combined image is synthesized and displayed. The combined image includes the overall structure identified from the original migrated data, but also includes the target events images in the newly migrated data. A reservoir engineer can then evaluate the production potential with the structures of interest adequately defined for analysis.

FIG. 10 shows an illustrative visibility analysis system in the form of a computer 50 having one or more input devices 54 and one or more output devices 56 through which it can interact with a user. Software (illustrated as portable information storage disks 52) configures the computer's processor(s) to receive user commands and responsively retrieve data from network or internal storage, process the data, and generate images for the user to view and analyze. When implementing the disclosed methods, the software can typically distribute the burden of processing the data across multiple computers interconnected by a network.

The foregoing description relies on a 2D seismic model for explanatory purposes. In practice, it should be expected that a 3D volume is being imaged, and that each of the source and receiver positions are specified in terms of at least two spatial coordinates. As one consequence, the source-receiver visibility map (see FIG. 7) is expected to have at least four spatial dimensions. Nevertheless, the underlying principles are the same.

In summary, a seismic visibility analysis methods and systems have been disclosed. These systems and methods quantitatively identify desirable source and receiver positions at the surface for a target event in complex media. The visibility strength for a given source-receiver geometry indicates whether a target event is visible or invisible with that geometry. Such knowledge is applied to acquisition survey design and prestack depth migration. Visibility experiments provide the following insights:

For a given target event, survey data outside the high-visibility area is unnecessary.

For a given target event, re-migration of traces outside the high-visibility are is unnecessary.

If a given target event has no high-visibility area, it cannot be reconstructed with the selected migration method.

Numerous variations and modifications will become apparent to those skilled in the art once the above disclosure is fully appreciated. It is intended that the following claims be interpreted to embrace all such variations and modifications.

What is claimed is:

1. A seismic survey method that comprises:
   determining visibility values of a target event as a function of seismic source and receiver positions, wherein said determining the visibility values of a target event includes:
      finding, for each of multiple simulated shots, a reflection wavefield from the target event in a seismic model;
      calculating, for each of multiple receiver positions, a contribution signal from each reflection wavefield; and
      converting each contribution signal into a source-receiver visibility value that indicates an energy intensity of a respective contribution signal;
   acquiring seismic data using a source-receiver geometry selected at least in part to include source and receiver positions associated with visibility values above a threshold; and
   imaging the target event based on the acquired seismic data.

2. The method of claim 1, wherein the seismic model is determined based at least in part on migrated data from a seismic survey.

3. The method of claim 1, wherein the target event is a subsurface feature that is selected by a user as being inadequately imaged.

4. The method of claim 1, wherein at least one of the visibility values is an integrated square of the contribution signal.

5. The method of claim 1, wherein the threshold is selected to capture a predetermined fraction of the area under a multidimensional visibility function associated with the visibility values.

6. A seismic migration method that comprises:
   determining visibility values of a target event at the source and receiver positions of traces in an existing seismic survey, wherein said determining the visibility values of a target event includes:
      finding, for each of multiple simulated shots, a reflection wavefield from said target event in a seismic model;
      calculating, for each of multiple receiver positions, a contribution signal from each reflection wavefield; and
      converting each contribution signal into a source-receiver visibility value that indicates an energy intensity of a respective contribution signal;
   re-migrating traces associated with visibility values above a threshold to generate an image of the target event; and
   displaying the image of the target event on a user interface.

7. The method of claim 6, wherein the seismic model is determined based at least in part on migrated data from the existing seismic survey, wherein said migrated data is obtained using a first migration method.

8. The method of claim 6, wherein said converting includes determining an integrated square of the contribution signal.

9. The method of claim 7, wherein said visibility values are determined using a second migration method different than the first migration method.

10. The method of claim 7, wherein said re-migration is performed using a second migration method different than the first migration method.

11. The method of claim 6, wherein the target event is a subsurface feature that is selected by a user as being inadequately imaged.

12. The method of claim 6, wherein the threshold is selected to capture a predetermined fraction of the area under a visibility function associated with the visibility values.

13. A visibility analysis system that comprises:
   a memory that stores visibility analysis software; and
   at least one processor coupled to the memory to execute the visibility analysis software, wherein the software configures the at least one processor to:
   determine, for each of multiple shots, a reflection wavefield from at least one target event in a seismic model;
   calculate, for each of multiple receiver positions, a contribution signal from each reflection wavefield;
   convert each contribution signal into a source-receiver visibility value that indicates an energy intensity of a respective contribution signal;
   process seismic data acquired using a source-receiver geometry selected at least in part to include source and receiver positions associated with source-receiver visibility values above a threshold to generate an image of the at least one target event, or re-migrate traces associated with source-receiver visibility values above a threshold to generate an image of the at least one target event; and
   display an image of the target event on a user interface.

14. The system of claim 13, wherein the software further configures the processor to visually map visibility as a function of at least one of source position and receiver position.

15. The system of claim 13, wherein the seismic model is determined based at least in part on migrated data from a seismic survey, wherein said migrated data is obtained using a first migration method.

16. The system of claim 15, wherein said source-receiver visibility values are determined using a second migration method different than the first migration method.

17. The system of claim 13, wherein the software further configures the processor to identify traces from an existing seismic survey for re-migration with an enhanced migration method, wherein the traces are identified based at least in part on their source-receiver visibility values.

18. The system of claim 13, wherein the software further configures the processor to identify source and receiver positions for additional seismic data acquisition, wherein said positions are identified based at least in part on source-receiver visibility values.

* * * * *